United States Patent [19]
Nanny

[11] 3,937,240
[45] Feb. 10, 1976

[54] CHECK VALVE

[76] Inventor: Walter C. Nanny, 5811 Valkeith, Houston, Tex. 77035

[22] Filed: Mar. 22, 1974

[21] Appl. No.: 453,595

[52] U.S. Cl. ............ 137/527.8; 251/152; 251/123
[51] Int. Cl.² ........................................ F16K 15/03
[58] Field of Search ............ 137/527, 527.2, 527.4, 137/527.6, 527.8, 514; 251/148, 123

[56] References Cited
UNITED STATES PATENTS

| | | | |
|---|---|---|---|
| 1,720,444 | 7/1929 | Rowley | 137/527.8 |
| 2,589,176 | 3/1952 | Wheatley | 137/527.8 X |
| 2,809,010 | 10/1957 | Ipsen et al. | 251/123 X |
| 2,925,827 | 2/1960 | Anderson et al. | 137/527.4 |
| 2,930,400 | 3/1960 | Wheatley | 137/527.8 |
| 2,969,492 | 1/1961 | Wheatley | 137/527.8 X |
| 3,131,719 | 5/1964 | Englert et al. | 137/527 |
| 3,265,060 | 8/1966 | Schreiber | 137/514 X |
| 3,616,814 | 11/1971 | Hendley | 137/527.8 |
| 3,687,155 | 8/1972 | Wheatley | 137/527.8 X |
| 3,720,225 | 3/1973 | Wheatley, Jr. | 137/527.8 X |

Primary Examiner—William R. Cline
Attorney, Agent, or Firm—Pravel & Wilson

[57] ABSTRACT

A check valve adapted for mounting between the faces of a pair of pipe flanges having flow passages of equal diameters and joined by bolts circumferentially spaced about the flanges. A valve body having a cylindrical flow passage therethrough is formed with end sections, each of which has a surface adapted for sealing engagement with a face of the pipe flanges, and a clapper being mounted for pivoting between a closed position completely blocking the valve body flow passage and an open position withdrawn from the flow passage but within the valve body.

6 Claims, 4 Drawing Figures

CHECK VALVE

BACKGROUND OF THE INVENTION

The field of this invention is one-way or check valves.

It is often necessary to utilize "through conduit" or "station venturi" check valves to control the direction of fluid flow in pipelines. Such valves permit only unidirectional fluid flow and are actuated by the direction of the fluid flow. When the valves are open, they provide open flow passages to allow passage of pipeline pigs, balls, or the like, and cause little interference with the normal fluid flow through the pipeline. In addition, it is highly desirable that the valves be constructed in such a manner that installation and replacement can be accomplished within minimal expenditures of time, labor and money.

In the past, check valves such as those described in U.S. Pat. Nos. 2,882,923; 3,191,619; and 3,720,225 were available. However, several problems were associated with such valves. For example, they required an enlarged area in the valve body to permit the pivotally mounted clapper to swing freely. This enlarged area caused a drop in the pipeline pressure and interfered with the normal fluid flow through the pipeline. Recesses at the bottom of the valve bodies caused fluid turbulence which also interfered with the normal fluid flow in the pipelines. Further, none of the known valves was constructed so that it could have been easily installed between portions of the pipeline having flow conduits of the equal size. The bodies of some of the valves had to be shaped to conform to particular flange designs, others required the use of pipe flanges having a unique design, and most necessitated the performance of welding, press-fitting, or sweating operations during the installation process.

SUMMARY OF THE INVENTION

It is an object of this invention to provide a new and improved check valve. The valve is adapted for mounting between the faces of a pair of pipe flanges having flow passages of equal diameters and joined by bolts circumferentially spaced about the flanges. Basically, the valve consists of a valve body having a pivotally mounted clapper for pivoting between a closed position completely blocking the flow passage through the valve body and an open position withdrawn from the flow passage but within the valve body. The valve body is formed with a pair of opposing end segments each of which has a surface formed for sealing engagement with the face of one of the pipe flanges. When the flange bolts are drawn tight, the forces exerted by the flange faces on the valve end segments hold the valve body in place. Because of this construction of the valve body, the valve of the present invention can be easily and quickly installed between the faces of standard pipe flanges. In addition, the maximum radial dimension of the valve body is smaller than the distance from the flange bolts to the center of the flange flow passages. This structure eliminates the need for constructing the valve body to conform to the exact placement of the flange bolts placed around the circumference of the flanges and, at the same time, permits utilization of the flange bolts as a protective shield for the valve.

In the through conduit embodiment of the preferred embodiment of the present invention, the entire body forms a flow passage having a substantially constant diameter. A closure means forms a cylindrical flow path equal in diameter to the flow path formed by the rest of the valve body, but eccentric with respect thereto. In this manner, the valve of the present invention provides a seating means for the clapper without substantially altering the diameter of the flow path through the valve body. Thus, in its open position, the valve of the present invention minimizes the pipeline pressure drop through the valve and causes little, if any, interference with the normal fluid flow through the pipeline. In the station venturi embodiment of the present invention, the seating means of the valve body includes an annular lip which forms a cylindrical flow passage smaller in diameter than the flow passage of the rest of the valve body. Thus, the annular lip forms a constriction in the flow path and may be utilized with a manometer or similar device to measure flow which is customarily provided by installation of an orifice plate or venturi tube in booster station manifold systems. At the same time, the valve also serves as a check valve.

DETAILED DESCRIPTION OF THE PREFERRED EMBODIMENTS

Figure 2:
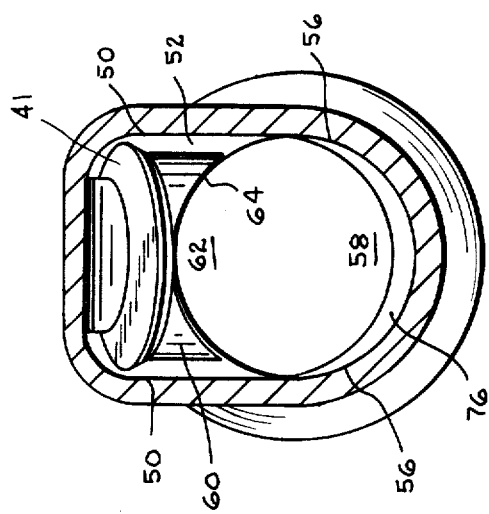
FIG. 2 is an end view of the through conduit embodiment of the present invention.

In the drawings, the letter A designates generally the valve of the present invention which includes a valve body B mounted between a pair of pipe flanges C. Valve body B has a flow passage D therethrough to allow passage of fluids through the valve. A clapper E is mounted within body B and pivots between a closed position completely blocking flow passage D and an open position withdrawn from flow passage D but within valve body B.

Figure 1:
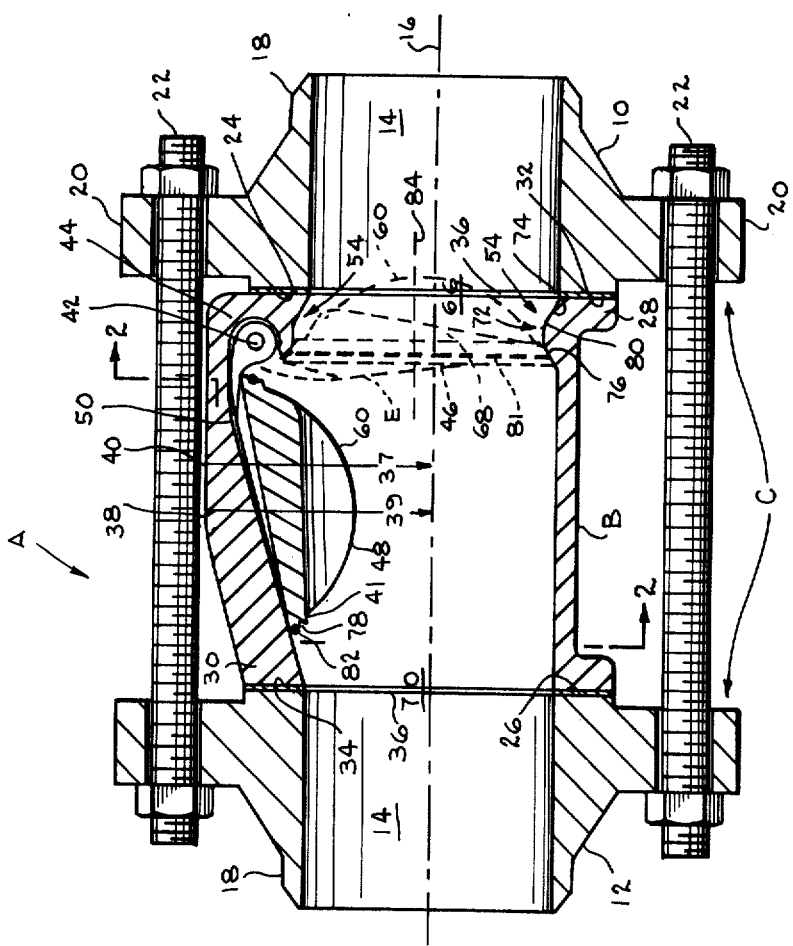
FIG. 1 is a cross-sectional view illustrating the through conduit embodiment of the present invention.
Figure 3:
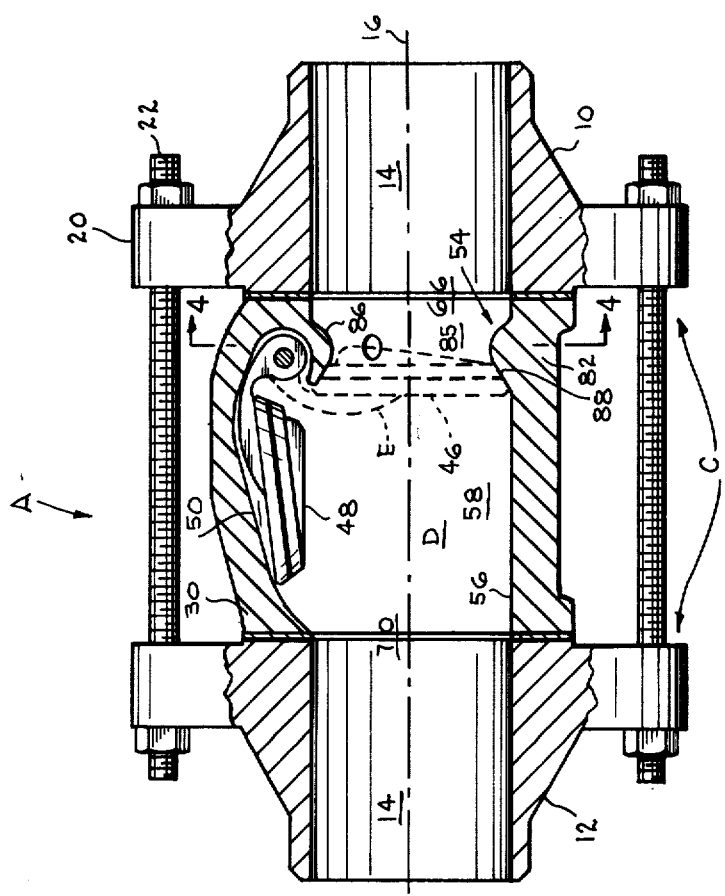
FIG. 3 is a cross-sectional view illustrating the station venturi embodiment of the present invention.

Considering the invention in more detail, FIGS. 1 and 3 illustrate valve A mounted between an upstream pipe flange 10 and a downstream pipe flange 12. Flanges 10 and 12 are standard pipe flanges representative of those commonly used in pipeline industry. Each of the flanges 10 and 12 has a substantially cylindrical flow passage 14 therethrough formed about a geometrical axis 16. In the preferred embodiment of present invention, the flow passage 14 through upstream pipe flange 10 is equal in diameter to the flow passage 14 through downstream pipe flange 12. An axial extension 18 of each of the flanges 10 and 12 connects the flanges to adjacent joints of pipe (not shown). A lip 20 extends radially from each of the flanges 10 and 12, and a plurality of circumferentially spaced flange bolts 22 pass through lips 20 to securely interconnect flanges 10 and 12 and valve body B.

The valve body B is mounted between a downstream face 24 of upstream pipe flange 10 and an upstream face 26 of downstream pipe flange 12. The valve body B, which is preferably cast as an integral unit but may be constructed in any convenient manner, is formed within upstream end section 28 and a downstream end section 30. A surface 32 of upstream end section 28 conforms to the shape of face 24 of upstream pipe flange 10 so that the surface 32 and face 24 are placed in sealing engagement with each other. Similarly, downstream end section 30 has a surface 34 which conforms to the shape of face 26. A pair of gaskets 36 or other suitable sealing means are preferably placed between the end section surfaces and the flanges faces to insure a fluid tight connection between flanges 10 and 12 of valve body B. With flange bolts 22 drawn tight, faces 24 and 26 exert a force on end sections 28 and 30, respectively, and hold valve body B securely in place.

Because the end sections 28 and 30 of valve body B are constructed for sealing, frictional engagement with the flange faces 24 and 26, the valve A may be easily installed between a wide variety of flanges commonly available in the pipeline industry. Most such flanges have radially extending, planar faces such as faces 24 and 26 shown in FIGS. 1 and 3. Accordingly, end sections 28 and 30 constructed with radially extending surfaces 32 and 34 may be readily installed with those types of flanges. However, the shapes of surfaces 32 and 34 may be modified to conform to alternately shaped flange faces. In addition, the end section structure of valve body B further facilitates installation and replacement of valve A by eliminating the need for altering the flange structure or performing welding, sweating and similar operations during installation. Valve A may be installed between pipe flanges having equal diameter flow passages simply by aligning valve body B between the flanges and tightening flange bolts 22.

Valve body B is also constucted so that the maximum radial dimension of the valve body is smaller than the distance from the flange bolts 22 to the center of the flow passages 14 through flanges 10 and 12. For example, as shown in FIG. 1, the distance 39 from a top portion 38 of valve body B to the geometrical axis 16 is smaller than the distance 37 from a lower side 40 of bolt 22 to axis 16. Because the valve body B does not extend to or beyond the flange bolts 22, valve A may be placed between flanges 10 and 12 without regard to the exact location of bolts 22 along the circumference of the flange lips 20. In addition, this limited dimension of valve body B permits utilization of flange bolts 22 as a protective shield around the valve A. Thus, valve A is protected from blows which might tend to dislodge the valve or damage it.

The valve body B, in cooperation with clapper E, forms an open and substantially cylindrical flow passage D for fluids flowing from the upstream side of valve A to the downstream side of the valve. The clapper E, which includes a disc 41, is mounted within the valve body B on a pivotal mounting means such as pin 42. The clapper pin 42 is journalled within a portion 44 of the valve body B or otherwise suitably mounted in the body with one or both ends projecting from the body for receiving indicator means or actuator means or the like. (Note: Pin may be extended through the body for such purposes as providing a positive flow indicator or an actuating system to assist or retard clapper actuation. That is, an externally mounted cylinder can advance or retard the clapper actuator on a flow stoppage or reversal.) Pin 42 pivots clapper E between a closed position shown in dashed lines at 46 and an open position shown in solid lines at 48 (FIGS. 1 and 3). In its closed position, clapper E completely blocks the flow passage D through valve A, but in its open position, clapper E is substantially withdrawn from flow passage D.

An inner wall portion 50 of valve body B between end sections 28 and 30 forms a chamber 52 exterior to the flow passage D but within valve body B (FIG. 2). Chamber 52 receives clapper E when the clapper is in its open position, thereby allowing the clapper E to withdraw from flow passage D. As discussed in more detail below, a second interior wall portion shown generally at 54 receives clapper E in its closed position 46 and provides a seating means for the clapper E. A third interior wall portion 56 extends from the downstream side of the second interior wall portion 54 to the downstream end section 30 and forms a partial cylindrical flow passage 58 opposite chamber 52. The third interior wall portion 56 immediately adjoins the downstream side of wall portion 54 and thereby eliminates recesses which would cause undue turbulence as fluid flows through valve A.

A clapper skirt 60 mounted on disc 41 of clapper E may be employed with valve A to form a partial cylindrical flow passage 62 opposite the flow path 58 formed by inner wall portion 56. An arcuate surface 64 extending from disc 41 of clapper E forms a flow path 62 when the clapper is in its open position 48. As can be seen from FIGS. 1 and 2, flow passage 58 formed by interior wall portion 56 has a uniform diameter. Therefore, by utilizing skirt 60 with clapper E, the part of flow path D downstream of the second interior wall portion 54 maintains its substantially uniform cylindrical shape, thereby minimizing the pressure losses and turbulence of fluid flowing through valve A.

The entire flow passage D through valve body B includes a flow passage 66 formed by end segment 28, a flow passage 68 formed by interior wall portion 54, flow passage 58 formed by interior wall portion 56, flow passage 62 formed by clapper skirt 60 and a flow passage 70 formed by the downstream segment 30 of valve body B. In the preferred embodiments of the present invention, flow passage 66, 62, 58, and 70 are each substantially equal in diameter to the flow passages 14 through pipe flanges 10 and 12. In the through conduit embodiment of the present invention (FIG. 1), flow passage 68 formed by the second interior wall portion 54 is also equal in diameter to the flow passages 14 through pipe flanges 12 and 10. That is, the entire flow passage D through valve body B has a substantially constant diameter.

As shown in FIG. 1, the seating means formed by the second interior wall portion 54 of the through conduit embodiment of the present invention includes an annular closure means 72. An upstream surface 74 of closure means 72 extends downstream from upstream end section 28 and forms a gradual incline from the end section 28. An uppermost point of upstream surface 80 is crowned to minimize any turbulence in the fluid passing over the surface. A downstream surface 76 of closure means 72 joins upstream surface 80 and the third interior wall portion 56. Downstream surface 76 is slanted with respect to axis 16 and forms a seating surface to receive a beveled edge 78 of disc 41 when clapper E is in its closed position 46. Downstream surface 76 is a sufficient distance downstream of pivot pin 42 such that the center of gravity of clapper E in the closed position is upstream of the pin 42 to provide a positive closure force in the no-flow condition as it pivots between its open position 48 and its closed position 46.

A gasket 81 or other suitable sealing means is mounted on beveled edge 78 of disc 41 to insure sealing engagement of clapper E and the downstream surface 76 when the clapper E is in its closed position 46. A small recess 82 also formed on beveled edge 78 of disc 41 and extending circumferentially thereof, entraps fluid and thus functions as a means for cushioning shock created when clapper E pivots to is closed position 46. As clapper E pivots toward closure 72, recess 82 makes initial contact with a surface 76 of closure 72. As the clapper E continues to pivot into position 46, recess 82 entraps slightly compressible fluid to absorb or reduce the shock of a sudden valve closure.

Closure means 72 of the through conduit embodiment of the present invention forms a flow passage 68 which is substantially cylindrical about geometric axis 84. Flow path 68 is eccentric with respect to flow passage 66 formed by end section 28. That is, axis 84 and axis 16 do not coincide. However, flow path 68 is equal in diameter to flow path 66. Thus, closure means 72 provides a seating means for clapper E but without altering the diameter of flow passage D through valve body B. Because of this constant diameter flow path D, valve A minimizes the pipeline pressure drop thorugh the valve and causes little, if any, interference with the normal fluid flow from the upstream pipe flange 10 to the downstream pipe flange 12. Yet, the structure also permits clapper E to seat in its closed position and completely block flow path D.

Figure 4:
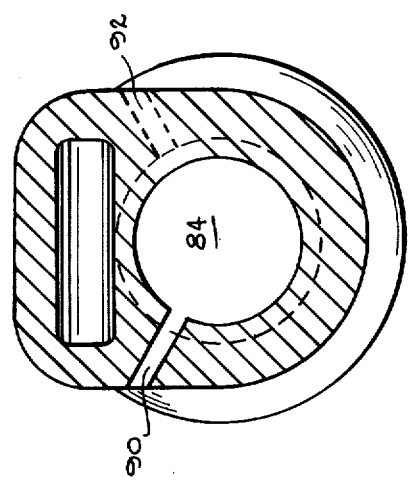
FIG. 4 is a partial sectional view taken at a midpoint of the station venturi embodiment.

In the station venturi embodiment of the present invention (FIG. 3), closure means 72 is replaced with an annular lip 82 formed by the second interior wall portion 54 of valve body B. Lip 82 forms a flow passage 85 which is concentric with flow passage 66 formed by upstream end segment 28, but is smaller in diameter than flow passage 66. Thus, flow passage 84 forms a constriction in valve body B which is necessary for the valve body to function as a station venturi valve. However, the upstream surface 86 of lip 82 is smooth so that it does not create undue turbulence in valve body B. A downstream surface 88 of lip 82 is beveled to form a seating position 46. In the station venturi embodiment of the present invention, valve body B also includes a pair of venturi tube nozzle access ports 90 and 92 (FIG. 4). Upstream access ports 92 may be formed immediately upstream of flow passage 66 formed by end section 28. The throat access ports 90 may be formed at the constricted flow passage 84 formed by annular lip 82. The difference in pressure between the full and reduced annular openings (or throat) A and B, each of which is of known diameter, provides a means of determining the rate of flow. The gradual enlargement 88 downstream from the throat (A) will permit a partial recovery of pressure much as a conventional venturi tube. A manometer (not shown) may be attached to ports 90 and 92 in the conventional manner to give an indication of the flow rate through valve body B from the differential in pressure at access ports 90 and 92. The remainder of the station venturi embodiment of valve A is substantially identical to the through conduit embodiment of the valve. Accordingly, like reference numerals have been used to indicate corresponding elements of the two embodiments of the valve. It should be noted, however, that the structure of the station venturi embodiment of valve A permits the valve to serve not only as a conventional station check valve, but also as a station flow detection device which may be readily installed between pipe flanges having equal diameter flow passages.

Both embodiments of valve A permit only uni-directional flow and are actuated by the direction of the fluid flow. Fluids flowing from pipe flange 10 toward pipe flange 12 cause clapper E to pivot around pin 42 into the clapper's open position 48. With the clapper in its open position, flow passage D through valve A may be completely open to allow passage of pipeline pigs, balls, or the like that will withstand a diametrical reduction. Further, the structure of valve body B causes little interference with the normal fluid flow from upstream to downstream. However, in the absence of any fluid flow or with flow from the downstream toward the upstream end of the valve, clapper E will pivot to its closed position 46 and completely block flow path D. It should be noted that body 30 may be reduced in dimension between flanges, permitting the clapper 46 to extend into the flowing stream much as a conventional wafer type check valve.

The foregoing disclosure and description of the invention are illustrative and explanatory thereof, and various changes in the materials and the details of the illustrated construction may be made without departing from the spirit of the invention.

I claim:
1. A check valve adapted for mounting between the faces of a pair of pipe flanges having flow passages of substantially equal diameters, equal radii of curvature, and joined by bolts circumferentially spaced about the flanges, comprising:
 a valve body having a flow passage of substantially uniform diameter therethrough;
 a clapper mounted with said valve body for closing off said flow passage through said body;
 pivotal mounting means for mounting said clapper for movement between a closed position completely blocking said flow passage through said valve body and an open position substantially within a chamber and withdrawn from said flow passage through said valve body;
 said valve body including:
  upstream and downstream end sections, each of which has a cylindrical flow passage therethrough equal in diameter to the diameter of said pipe flange flow passages and alignable with said pipe flange flow passages;
  a chamber section between said end sections having a chamber therein, said chamber communicating with and being adjacent to said flow passage through said valve body and being formed to receive said valve clapper with said valve clapper in its open position;
  seating means immediately downstream of said upstream end section and substantially perpendicular to said valve body flow passage for seating said clapper with said clapper in its closed position, said seating means including an annular section having a flow passage therethrough equal in diameter to said end section flow passages and parallel to said end section flow passages, but eccentric with respect to said end section flow passages; and
  a downstream section immediately adjoining the downstream side of said seating means and extending to said downstream end section, said downstream section having a partial cylindrical flow passage therethrough with a radius of curvature substantially equal to the radius of curvature of said pipe flange flow passages; and skirt means mounted on one side of said clapper for forming a complementary partial cylindrical flow passage downstream of said seating means with said clapper in its open position so that said downstream section partial cylindrical flow passage and said complementary partial cylindrical flow passage jointly form a cylindrical flow passage downstream of said seating means which cylindrical flow passage is equal in diameter to said end section flow passages, whereby with said clapper in its open position said valve body has a flow passage of substantially uniform diameter therethrough so that changes in the pressure of fluid flowing through said valve body are minimized.

2. The structure set forth in claim 1, wherein said clapper includes:

a recess formed in the circumference of the sealing portion of said clapper for cushioning the shock created by the closure of said clapper upon contact with the seating means for said clapper.

3. The structure set forth in claim 1, wherein:

said valve body has a maximum radial dimension smaller than the distance from said flange bolts to the center of said flange flow passages.

4. The structure set forth in claim 1, wherein each of said end sections includes:

a surface formed for sealing engagement with the face of one of said flanges with said flange bolts securely interconnecting said flanges and said valve body.

5. A station venturi check valve adapted for mounting between the faces of a pair of pipe flanges and having flow passages of substantially equal diameters, equal radii of curvature and joined by bolts circumferentially spaced about the flanges, comprising:

a valve body having a flow passage therethrough;

a clapper mounted with said valve body for closing off said flow passage through said body;

pivotal mounting means for mounting said clapper between a closed position completely blocking said flow passage through said valve body and an open position substantially within a chamber and withdrawn from said flow passage through said valve body;

said valve body including:

upstream and downstream end sections, each of which has a cylindrical flow passage therethrough equal in diameter to the diameter of said pipe flange flow passage and alignable with said pipe flange flow passages;

a chamber section between said end sections having a chamber therein, said chamber communicating with and being adjacent to said flow passage through said valve body and being formed to receive said valve clapper with said clapper in its open position;

seating means immediately downstream of said upstream end section and substantially perpendicular to said valve body flow passage for seating said clapper with said clapper in its closed position, said seating means including an annular lip having a cylindrical flow passage therethrough smaller in diameter than said flange flow passages, but parallel to said end section flow passages to form a constriction in the flow passage formed by said valve body; and a downstream end section immediately adjoining the downstream side of the seating means and extending to said downstream end section, said downstream section having a partial cylindrical flow passage therethrough, the radius of curvature of said partial cylindrical flow passage being substantially equal to the radius of curvature of said pipe flange flow passages; and skirt means mounted on one side of said clapper for forming a complementary partial cylindrical flow passage downstream of said seating means with said clapper in its open position so that downstream section partial cylindrical flow passage and said complementary partial cylindrical flow passage jointly form a cylindrical flow passage downstream of said seating means which cylindrical flow passage is equal in diameter to said end section flow passages, whereby with said clapper in its open position said valve body has a flow passage of substantially uniform diameter therethrough except for the constriction formed by said seating means so that turbulence and unwanted changes in the pressure of fluid flowing through said valve body are minimized.

6. The structure set forth in claim 5, wherein:

said valve body forms access ports for receiving pressure sensing devices.

* * * * *